Feb. 21, 1939.   F. BOCK   2,148,397

OPHTHALMIC MOUNTING

Filed May 3, 1934

Inventor:
Fritz Bock

Patented Feb. 21, 1939

2,148,397

UNITED STATES PATENT OFFICE 2,148,397

OPHTHALMIC MOUNTING

Fritz Bock, Berlin-Charlottenburg, Germany

Application May 3, 1934, Serial No. 723,710
In Germany May 10, 1933

1 Claim. (Cl. 88—49)

This invention relates to improvements in ophthalmic mountings and its object is to provide means for obtaining a perfect seat of the spectacles or eye-glasses relatively to the eyes of the bearer, as well as to the nose of the same in an automatic way. In other words: the invention permits adjustment of the spectacle or eyeglass frames or, more precisely, the bridges of the same with respect to the nose of the respective bearer either only as regards the sides of the nose, if already that should prove sufficient, or as regards the bridge of the nose, too.

Figure 1:
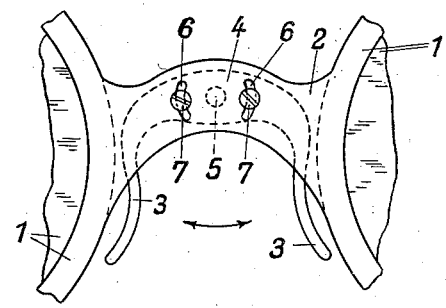
Figure 2:
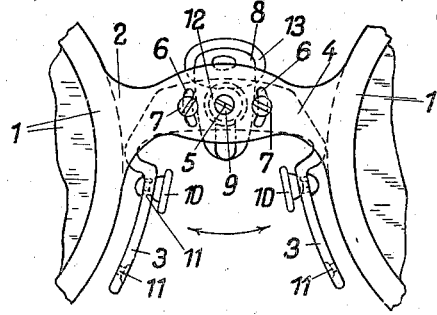
Figure 3:
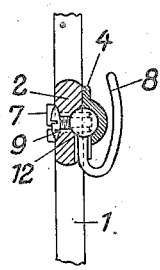
Figure 4:
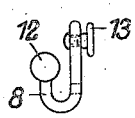
Figure 5:
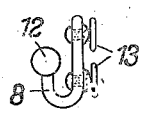

The invention is illustrated diagrammatically and by way of example on the accompanying drawing on which Figure 1 is a front-view of one constructional form of the same. Figure 2 is a similar representation showing another constructional form as modification. Figure 3 is a vertical transverse section through the middle portion of Fig. 2. Figure 4 shows a modification of Fig. 3; and Figure 5 shows another modification, as regards a certain detail, all as fully set forth in the following description.

On the drawing, 1 denotes the known frame of the spectacles or eye-glasses, and 2 is the known bridge of the same. There is in the middle portion or centre of the bridge 2 a pivot 5 which serves as support for an inverted U-shaped structure composed of two side-members 3 intended to bear on the sides of the nose of the bearer of the respective spectacles or eye-glasses, and of an intermediate member 4 connecting said side-members 3 with one another. The structure 3, 4, 3 which resembles a double-armed lever, the arms of which have equal length and equal shape, and which is turnable upon the pivot 5 in the plane of the frame 1 (see the double-headed arrow in the lower portion of the figure) so as to be adjustable with respect to the nose of the bearer, and it can be secured in its adjusted position relatively to the bridge 2 by means of screws 7 extending from the front of the bridge 2 through slots 6 provided in the bridge and curved circularly with respect to the pivot 5, the ends of said screws engaging the said intermediate part 4. When the structure 3, 4, 3 has assumed its proper position upon the nose, which takes place automatically, said screws 7 are tightened whereby it is firmly connected with the said bridge and the side members 3 bear continually correctly upon the sides of the nose of the bearer.

While the constructional form illustrated in Fig. 1 relates solely to an adjustment relatively to the sides of the nose, Fig. 2 relates, besides, to an adjustment relatively to the bridge of the nose itself. 8 denotes a member which is to bear upon the nose bridge and is turnable in the plane of the spectacle or eyeglass frame like the structure 3, 4, 3. The member or rest 8 is located between this structure and the nose bridge, as appears also from Fig. 3, in which is, furthermore, shown that as member for attaching the rest 8 to the bridge 2 a ball-joint 12 is used, which can be secured by means of a screw 9, and one half of which is located in a semi-spherical cavity of the bridge 2 and the other half of which is located in a semi-spherical cavity of the intermediate member 4 of the structure 3, 4, 3. The rest 8 is about V-shaped or U-shaped when being looked at from the left or from the right, as in Figs. 3, 4 and 5. The V or U forms a narrow short leg which extends downwardly from the ball 12, and a broad long leg which constitutes the nose bridge rest proper, as appears from Figs. 2 and 3.

The side members 3 may be shaped as in Fig. 1 or as in Fig. 2 or similarly, and they may be provided with pads 10, as in Fig. 2. Also the nose rest 8 may be provided with a pad or with pads 13, as in Figs. 4 and 5. The pads 10 in Fig. 2 are supported in holes 11 in the side members 3. There are to be two pads in each side-member, but the lower pads have been left away in order to show more distinctly the holes 11. Such pads or similar ones may be provided also at the side-members 3 of Fig. 1.

It will be obvious that, when employing the invention, first the position of the glasses is regulated with respect to the eyes, the structure 3, 4, 3 being loosely turnable during this time and adjusting itself with respect to the nose of the bearer of the spectacles or eyeglasses, whereafter the screws 7 are drawn home so as to secure said structure in its adjusted position. The nose rest 8 does not require a separate adjustment and fixation.

I wish it to be understood that my invention is not limited to the few constructional forms shown merely by way of example. Various variations in the details are possible without constituting departures from the invention.

I claim:

Optical glasses, comprising, in combination, lenses for the eyes, a rigid connection between the lenses, inverted U-shaped means carrying nose pads for each side of the nose, pivotal means connecting said nose pads carrying means to said connection, the axis of said pivotal means being substantially perpendicular to the plane of the lenses to permit pivotal movement of the glasses with respect to the nose pad carrying means in the plane of the lenses, a nose pad for the bridge of the nose, and a ball-joint connecting said nose pad for the bridge of the nose with said rigid connection between the lenses independently from the said inverted U-shaped means.

FRITZ BOCK.